United States Patent [19]

Frost

[11] Patent Number: 4,817,039

[45] Date of Patent: Mar. 28, 1989

[54] ATMOSPHERIC CONTROLLED VIDEO SIMULATION SYSTEM

[75] Inventor: Walter Frost, Tullahoma, Tex.

[73] Assignee: FWG Associates, Inc., Tullahoma, Tenn.

[21] Appl. No.: 833,158

[22] Filed: Feb. 27, 1986

[51] Int. Cl.$^4$ .................. G01M 9/00; H04N 5/76; G06F 13/06

[52] U.S. Cl. .................. 364/420; 73/147; 73/865.6

[58] Field of Search ............ 364/420, 900, 423, 521; 340/702, 518, 521, 578; 73/147, 865.6; 360/14.3, 33.1, 72.2

[56] References Cited

U.S. PATENT DOCUMENTS

| | | | |
|---|---|---|---|
| 3,736,411 | 5/1973 | Berndt | 364/423 |
| 3,810,138 | 5/1974 | Thompson | 340/518 |
| 4,356,475 | 10/1982 | Neumann | 340/521 |
| 4,427,977 | 1/1984 | Carollo | 340/702 |
| 4,449,198 | 5/1984 | Kroon | 364/900 |
| 4,538,188 | 8/1985 | Barker | 360/72.2 |
| 4,646,564 | 3/1987 | Ide | 73/865.6 |

Primary Examiner—Michael R. Fleming
Attorney, Agent, or Firm—Neil F. Markva

[57] ABSTRACT

The assembly performs the method for monitoring and predicting gaseous pollutant cloud drift and dispersion across complex terrain resulting from the site a source or potential source of pollution. Cloud drift and dispersion simulation information is produced for the earth surface terrain site under a wide range of simulated atmospheric conditions. The cloud drift and dispersion simulation information is then recorded and stored for later retrieval. The prevailing environmental conditions are monitored at the actual terrain site. As the time for the formation of a cloud of material such as an exhaust plume of a flight vehicle or movement of toxic gas is anticipated, information is selected from the recorded drift and dispersion simulation information in response to the preselected environmental conditions monitored at the actual terrain site. Thus, the selected information is displayed to predict and monitor the cloud drift and dispersion at the actual terrain site on a real-time basis under prevailing environmental conditions. In a specific embodiment, an interactive video display mechanism is responsive to the prevailing environmental atmospheric conditions at the actual terrain site for displaying selected video images of simulated cloud drift and dispersion information.

24 Claims, 1 Drawing Sheet

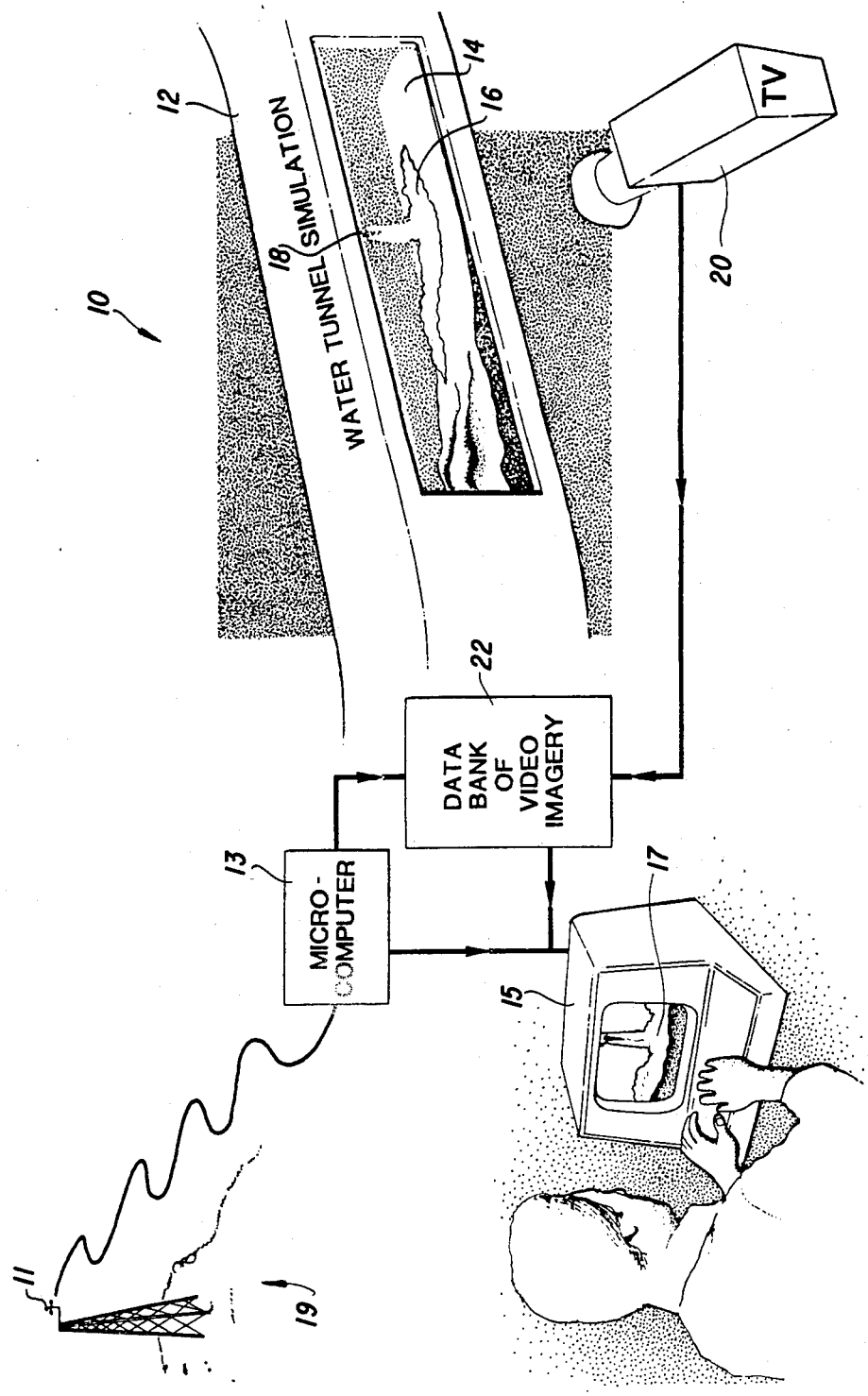

ATMOSPHERIC CONTROLLED VIDEO SIMULATION SYSTEM

FIELD OF THE INVENTION

This invention relates to the predicting of cloud drift and dispersion across an earth surface terrain site. More particularly, this invention relates to the visual display of cloud drift and dispersion across a terrain site on a real-time basis in response to monitored prevailing environmental conditions.

BACKGROUND OF THE INVENTION

The simulation and visualization of meterorlogical conditions, ground cloud diffusion and environmental conditions related to flight training is disclosed in the following U.S. Pat. Nos.

| | | |
|---|---|---|
| 4,356,475 | 3,736,411 | 4,077,062 |
| 4,128,834 | 4,207,688 | 4,427,977 |
| 3,810,138 | 4,078,317 | 3,931,462 |

The drift and dispersion of contaminated ground clouds create hazardous and adverse environmental effects as they travel across the earth's surface. Such ground clouds include space shuttle exhaust clouds, nuclear power plant accident, radioactive clouds, plumes from smokestacks and any other type of cloud produced from a pollution source.

Many situations arise where the drift and dispersion of such ground clouds must be monitored in real-time. Such drift and dispersion depend strongly upon prevailing atmospheric conditions at the particular location of the earth surface terrain site. Any system for predicting such cloud drift and dispersion must be capable of operating effectively where the terrain is irregular and complex. Such a system must also take into account the differing wind speeds and direction as it passes over such complex terrain.

As an example, where the launch site of a flight vehicle is over complex terrain, the approaching wind will be irregular with fingers of high speed flow and zones of stagnant or recirculation air occurring simultaneously. The characteristics of such wind flow will depend upon whether it is a nighttime wind or a daytime wind and the particular season of the year in which the ground cloud occurs.

Current techniques for forecasting hazardous cloud drift and dispersion are based on numerical models. Such technique are presently incapable of modeling the effects of complex terrain on cloud transport and diffusion. Thus, numerical models provide poor and unreliable predictions of such cloud drift and dispersion.

In a known comprehensive cloud monitoring program based on numerical modeling of the direction of cloud travel over a terrain site, the REED computer code is used to predict the transport direction of the exhaust ground cloud produced by a flight vehicle launch. During such a launch, the prediction model is run at various times just preceding the launch. Thus, it may begin at 48 hours before the launch and then at specific hours such as 24, 12, 6, 3, and at the time of the launch. However, the REED model is severely lacking in its ability to incorporate topographical effects upon the drift and dispersion of the exhaust cloud of the flight vehicle.

The topography of a launch site is recognized as a major factor controlling the localized weather conditions also referred to as site-specific climate and micrometeorology. Thus, a complicated system of mountains, valleys, points and planes results in a wide variation in local climatic conditions. For instance, fogs are often limited to the immediate area of a shoreline by coastal mountains and proceed inland only along the valleys between the mountains. Higher inland mountains cause strong uplifting of marine air masses leading to cloudiness and rain showers. Where strong temperature inversions occur, they have a significant influence on exhaust cloud drift and dispersion. Such inversions effectively form a lid for the lower atmosphere thereby trapping the exhaust cloud and hindering normal diffusion and dispersion.

Varying terrain or topography plays a particularly important role in the characteristics of any temperature inversion. Furthermore, wind speed and direction may vary greatly as a result of widely varying terrain. There is a necessity for predicting such terrain effects and for predetermining any effect of the variation of wind speed and direction upon the drift and dispersion of such ground clouds.

PURPOSE OF THE INVENTION

The primary object of the invention is to provide an assembly and an operational method for predicting and monitoring ground cloud drift and dispersion across an earth surface terrain site regardless of the complexity of such site by visually displaying the simulated results based on real-time measurements of the prevailing meteorological conditions.

Another object of the invention is to effectively model the terrain effects on the transport and diffusion of ground clouds occurring at an earth surface terrain site.

A further object of this invention is to provide a system for modeling cloud drift and dispersion under varying environmental conditions such as wind speed, wind direction, and the creation of recirculating stagnation zones by flow over hills.

A still further object of the invention is to provide a system for visualizing the predicted cloud drift and monitor drift and dispersion of contaminated plumes and ground clouds over a wide range of wind speed and directions, atmospheric stability conditions and plume densities.

A still further object of the invention is to provide a storage system for video imagery categorized and indexed with respect to prevailing meteorological conditions.

Another object of the invention is to interface the stored data with an electronic retrieval system that selects imagery based on measured meteorological conditions at the site and display the simulated imagery on video monitors.

SUMMARY OF THE INVENTION

The invention as disclosed and described herein is an assembly and a method of predicting cloud drift and dispersion across an earth surface terrain site. The assembly comprises means for producing cloud drift and dispersion simulation information under various simulated atmospheric conditions at the earth surface terrain site. The simulation information is stored on a record means by recording means. Interactive video display means is responsive to prevailing environmental atmospheric conditions at the actual terrain site and displays selected video images of the simulated cloud drift and dispersion simulation information stored on the record means. The simulated cloud drift and dispersion information displayed corresponds to the prevailing environmental conditions being monitored at the actual terrain site.

The method of the invention comprises the steps of producing cloud drift and dispersion simulation information under various simulated atmospheric conditions at the earth surface terrain site. The simulation information is recorded on a video storage record means. When it is desired to predict such cloud drift and dispersion at the terrain site, video images are selected from the video storage record means in response to monitored prevailing environmental atmospheric conditions. Thus an interactive video display is produced showing simulated cloud drift and dispersion information to determine the anticipated drift and dispersion of clouds which might occur at the actual terrain site over a period of elapsed real-time.

The method of the present invention includes the steps of (1) producing cloud drift and dispersion simulation information for the earth surface terrain site under various simulated atmospheric conditions, (2) recording such simulation information on a recorded means, (3) monitoring the prevailing environmental conditions at the actual terrain site, (4) selecting corresponding information from the simulation information in response to the environmental conditions monitored at the actual terrain site, and (5) displaying the selected information to predict cloud drift and dispersion at the actual terrain site on a real-time basis under prevailing environmental conditions. The assembly of the invention includes all the specific means to accomplish these results.

A particular feature of the invention is that the simulation information providing means includes means for simulating a drift of clouds within an atmospheric fluid tunnel over a period of elapsed real-time. The simulating means may include a model of the actual earth surface terrain surface with means for changing the simulated environmental conditions of temperature, wind speed and wind direction within the atmospheric fluid tunnel. The simulating means further includes means for producing a simulated cloud within the fluid tunnel. The simulated cloud producing means includes means for simulating a source representative of exhaust ground cloud, toxic gas spills, smoke stacks, etc. at the simulated terrain site.

Another feature of the invention is directed to the specific recording means which includes a means for scanning the visible simulated drift of clouds over a period of elapsed real-time within the atmospheric simulation fluid tunnel. The scanning means includes a means for generating a video signal and a recording means includes a means responsive to this video signal for storing a video image on a record means.

In a specific embodiment, the scanning means comprises a video camera. The simulation information recording means includes data storage means. Indexing means organizes the simulated cloud drift and dispersion information so that the prevailing environmental conditions may be monitored and used to select corresponding simulated cloud drift and dispersion information under the indexed simulated environmental conditions.

The monitoring means includes means for determining wind direction and speed, temperature of the prevailing atmosphere and then includes means for generating an electrical command signal representing the prevailing environmental conditions at the terrain site. The responsive selecting means includes computer means for correlating the actual prevailing environmental conditions to corresponding simulated cloud drift information located on the record means. A specific embodiment of the displaying means includes a display screen of a cathode ray tube.

BRIEF DESCRIPTION OF THE DRAWINGS

The only drawing shows a schematic representation of a specific embodiment of an interactive display system used for predicting the cloud drift and dispersion at an earth surface terrain site.

DETAILED DESCRIPTION

The specific embodiment of an assembly and method for predicting cloud drift and dispersion at an earth surface terrain site at which the prevailing environmental conditions are monitored is generally designated 10. The atmospheric fluid tunnel 12 is designed for water to be continuously moved therethrough. The techniques of water tunnel simulation wherein the velocity of the fluid and the temperature thereof is changed to simulate environmental conditions has been used by the inventor with respect to other systems. Any fluid in which a valid simulation can be carried out may be used.

A model 14 of the actual terrain site 19 is first placed into the water tunnel 12. The model 14 is disposed on a rotatable support means such as a simple turntable or the like so that the direction of fluid flow can be changed simply by rotating the disposition of the model 14. Thus, wind speed, channeling through valleys occurring on model 14 and the recirculating of stagnation zones can be simulated.

In this specific embodiment, a simulated flight vehicle 18 is moved upwardly from the surface of model 14 while ejecting a dye solution forming a cloud 16 while water is moved through the tunnel 12. Model 14 is on a scale of about 1:4,000 of the actual earth surface terrain site 19. The topography of site 19 is determined from maps and the model includes the various structures located thereon. In this embodiment, site 19 constitutes a launching area for a flight vehicle such as the space shuttle being launched for scientific study in the space surrounding earth. The atmospheric boundary layer at site 19 is carefully simulated in water tunnel 12. The exhaust cloud of the booster rockets and main engine of the flight vehicle are modeled with a dye solution injected through a triangular cluster of tubes. The lift-off of the flight vehicle 18 is simulated by raising the tubes from the modeled launch site at the particular lift-off velocity for the flight vehicle.

A video camera 20 constitutes a recording means which records the visually simulated drift and dispersion of cloud 16 in tunnel 12. The video images scanned by video camera 20 are stored in the data bank 22. The video images for numerous wind speeds and directions, stable and unstable atmospheric boundary layer conditions, various flow rates and exit velocities for the simulated flight vehicle are recorded in the storage data bank 22 with camera 20. The video images for the various conditions are cataloged and indexed to correlate the simulated conditions within tunnel 12 at the model 14 with the corresponding measured atmospheric conditions which prevail at the actual launch terrain site 19. The camera 20 scans the simulated lift and dispersion of cloud 16 from various angles. Thus, the simulated trajectory of the exhaust ground cloud from the flight vehicle may be viewed from different positions and stored accordingly.

A full-scale field experiment is conducted at the actual site 19 to verify the accuracy of the simulation in water tunnel 12. Instruments used to measure wind direction and speed are disposed at predetermined locations at site 19. For example, anemometer 11 can be used to measure the prevailing wind speed and direction at site 19. Smoke release sites are then chosen at site 19. Smoke is then released and the drift and dispersion of the released smoke cloud is videotaped with aerial and ground based TV cameras. The field experiment is then simulated in water tunnel 12. The simulation technique is verified and modified to assure its fidelity with the full scale test.

Once the accurate model 14 is completed and the smoke release experiments are confirmed at site 19, simulation information of the drift and dispersion of cloud 16 is carried out over a range of wind speeds, wind directions and atmospheric stability conditions to establish the dimensions and scope of the video imagery data base 22. With such a study, the correct corresponding positions at the site 19 are determined in the water tunnel 12 for prevailing wind speed, wind direction and temperature differences measured at site 19. Such information is then categorized and indexed for each video scenario in data base 22. The on-site measured meteorological data obtained at site 19 is entered into a microcomputer 13. Appropriate software is used to select the corresponding video image of the ground cloud drift and dispersion so that the simulated trajectory of the ground cloud may be displayed as viewed from different positions by the observer. The simulated display 17 is located on the screen of the cathode ray tube 15.

In operation, once the simulation information obtained by scanning the water tunnel simulation is stored in data bank 22, the prevailing wind conditions are monitored at site 19 using an anemometer 11. Electrical command signals from anemometer 11 to microcomputer 13 result in a search of data bank 22 to find the simulated cloud drift corresponding to the environmental conditions at site 19 over a period of elapsed real-time. Thus, the meteorological instrumentation 11 is permanently installed at site 19 and connected to microcomputer 19 to interface the meteorological input with video display 15 having a video disk drive. This combination of elements constitutes an interactive video display system responsive to prevailing environmental atmospheric conditions at the actual terrain site for displaying selected video images of simulation cloud drift and dispersion information stored on the data bank 22 and corresponding to the prevailing environmental conditions at the actual terrain site 19.

The video simulation system of this invention is responsive directly to the ambient atmospheric conditions at the site of the anticipated cloud drift. Thus, the disclosure is directed to an atmospheric controlled video simulation system. The atmospheric data at the site is used to find the corresponding simulated information stored in the storage data bank 22.

While the atmospheric controlled assembly for predicting cloud drift and dispersion has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of the invention, what is claimed is:

1. An atmospheric controlled assembly for predicting cloud drift and dispersion across an earth surface terrain site, said assembly comprising:
   (a) means for producing cloud drift and dispersion simulation information for the earth surface terrain site under various simulated atmospheric conditions,
   (b) means for recording on a record means images of the cloud drift and dispersion simulation information produced from said means for producing said cloud drift and dispersion simulation information under various simulated atmospheric conditions,
   (c) means for monitoring the prevailing environmental atmospheric conditions at the actual terrain site,
   (d) means for selecting corresponding atmospheric condition image information from the simulated atmospheric conditions recorded on the record means in response to the prevailing environmental atmospheric conditions monitored at the actual terrain site, and
   (e) means for displaying the selected corresponding atmospheric condition image information from the record means to predict cloud drift and dispersion at the actual terrain site on a real-time basis under prevailing environmental atmospheric conditions.

2. An assembly as defines in claim 1 wherein
the simulation information providing means includes means for simulating a drift of clouds within an atmospheric fluid tunnel over aperiod of elasped real-time.

3. An assembly as defined in claim 2 wherein
the simulating means includes a model of the actual earth surface terrain site over which the assembly is predicting cloud drift and dispersion.

4. An assembly as defined in claim 2 wherein
the simulating means includes means for changing the simulated environmental atmospheric conditions of temperature, wind speed and wind direction within the atmospheric fluid tunnel.

5. An assembly as defined in claim 2 wherein
the fluid in the atmospheric fluid tunnel is water.

6. An assembly as defined in claim 2 wherein
the simulating means includes means for producing a simulated cloud within the fluid tunnel.

7. An assembly as defined in claim 6 wherein
the simulated cloud producing means includes means for simulating the lift-off of a flight vehicle from the earth surface at the simulated terrain site.

8. An assembly as defined in claim 1 wherein
the simulation information includes a visible drift of clouds within an atmospheric fluid tunnel and
the recording means includes a means for scanning the visible simulated drift of clouds over a period of elapsed real-time.

9. An assembly as defined in claim 8 wherein
the scanning means includes a means for generating a video signal, and
the recording means includes a means responsive to said video signal for storing a video image on a record means.

10. An assembly as defined in claim 9 wherein
the scanning means includes a video camera.

11. An assembly as defined in claim 1 wherein the simulation information recording means includes data storage means.

12. An assembly as defined in claim 1 wherein the monitoring means includes means for determining wind direction and speed across the earth surface at the terrain site.

13. An assembly as defined in claim 12 wherein the monitoring means includes a means for determining temperature of the prevailing atmosphere at the terrain site.

14. An assembly as defined in claim 1 wherein the monitoring means includes means for generating an electrical command signal representing the prevailing environmental atmospheric conditions.

15. As assembly as defined in claim 1 wherein the responsive selecting means includes computer means to correlate the actual prevailing environmental atmospheric conditions to corresponding simulated cloud drift information located on the recording means.

16. An assembly as defined in claim 1 wherein the displaying means includes a display screen of a cathode ray tube.

17. An assembly for predicting cloud drift and dispersion in real-time across an earth surface terrain site, said assembly comprising:
   (a) means for producing video images of cloud drift and dispersion simulation information under various simulated atmospheric conditions at the earth surface terrain site,
   (b) means for recording the cloud drift and dispersion simulation information on a record means,
   (c) means for monitoring prevailing environmental atmospheric conditions at the actual terrain site, and
   (d) interactive video display means responsive to said prevailing environmental atmospheric conditions for displaying selected video images of simulation cloud drift and dispersion information stored on the record means and corresponding to said prevailing environmental atmospheric conditions at the actual terrain site.

18. A method for predicting cloud drift and dispersion across an earth surface terrain site, said method comprising the steps of:
   (a) producing video images of cloud drift and dispersion simulation information under various simulated atmospheric conditions at the earth surface terrain site,
   (b) recording the cloud drift and dispersion simulation information on a video image storage record means,
   (c) monitoring prevailing environmental atmospheric conditions at the actual terrain site, and
   (d) displaying selected video images from the video image storage record means in response to said monitored prevailing environmental atmospheric conditions to produce an interactive video image display of said simulated cloud drift and dispersion information to determine the anticipated drift and dispersion of clouds at the actual terrain site.

19. A method as defined in claim 18 wherein the steps of producing video images of cloud drift and dispersion simulation information includes simulating the drift and dispersion of clouds within an atmospheric fluid tunnel.

20. A method as defined in claim 18 wherein the cloud drift and dispersion simulation information producing step includes simulating atmospheric boundary layers under stable and unstable conditions within the atmospheric fluid tunnel.

21. A method as defined in claim 20 wherein the model is rotated to determine the drift and dispersion of simulated clouds at differing wind directions.

22. A method as defined in claim 18 wherein the step of recording the simulation information includes scanning the visible simulated cloud drift and dispersion within the atmospheric fluid tunnel while varying the velocity of the fluid flow through the atmospheric fluid tunnel.

23. A method for predicting cloud drift and dispersion across an earth surface terrain site, said method comprising the steps of:
   (a) providing a model of the earth surface terrain site in an atmospheric fluid tunnel,
   (b) simulating the drift and dispersion of clouds over the model within the fluid tunnel under various simulated atmospheric conditions,
   (c) recording video images of the simulated drift and dispersion of clouds under said various simulated atmospheric conditions to generate a data base of video imagery,
   (d) monitoring the environmental atmospheric conditions at the actual earth surface terrain site represented by the model in the atmospheric fluid tunnel,
   (e) generating an electrical command signal in response to prevailing environmental atmospheric conditions monitored at the actual site,
   (f) correlating the electrical command signals with the recorded video image representation of the simulated cloud and dispersion, and
   (g) displaying a video image of the simulated representation of the cloud drift and dispersion recorded under prevailing atmospheric conditions being monitored at the actual site.

24. A method as defined in claim 23 wherein the recording step includes indexing the video images according to preselected environmental atmospheric conditions monitored at the actual earth surface terrain site.

* * * * *